US008421416B2

(12) United States Patent
Hsu et al.

(10) Patent No.: US 8,421,416 B2
(45) Date of Patent: Apr. 16, 2013

(54) BATTERY CHARGE COMPENSATION

(75) Inventors: Tsing Hsu, Allen, TX (US); Yevgen Barsukov, Richardson, TX (US); Robert Martinez, Lucas, TX (US); Peter Mignano, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 475 days.

(21) Appl. No.: 12/424,184

(22) Filed: Apr. 15, 2009

(65) Prior Publication Data
US 2009/0261786 A1  Oct. 22, 2009

Related U.S. Application Data

(60) Provisional application No. 61/045,542, filed on Apr. 16, 2008.

(51) Int. Cl.
*H02J 7/00* (2006.01)
*H02J 7/04* (2006.01)
*H02J 7/24* (2006.01)
*G01N 27/416* (2006.01)

(52) U.S. Cl.
USPC ........... 320/134; 320/152; 320/157; 320/158; 320/159; 320/162; 320/163; 320/164; 320/132; 324/430; 324/433; 324/434

(58) Field of Classification Search .................. 320/134, 320/162
See application file for complete search history.

(56) References Cited

U.S. PATENT DOCUMENTS

| | | | | |
|---|---|---|---|---|
| 5,557,192 A * | 9/1996 | Tamai | ............. | 320/164 |
| 5,861,733 A * | 1/1999 | Yoshikawa | ............. | 320/143 |
| 5,869,949 A * | 2/1999 | Nishikawa et al. | ............. | 320/101 |
| 6,002,237 A * | 12/1999 | Gaza | ............. | 320/116 |
| 6,198,252 B1 * | 3/2001 | Mukainakano | ............. | 320/128 |
| 6,832,171 B2 | 12/2004 | Barsoukov et al. | | |
| 7,598,709 B2 * | 10/2009 | Guang et al. | ............. | 320/135 |
| 7,602,151 B2 * | 10/2009 | Lai et al. | ............. | 320/145 |
| 2006/0176022 A1 * | 8/2006 | Namba | ............. | 320/130 |
| 2006/0232241 A1 * | 10/2006 | Lu et al. | ............. | 320/125 |
| 2007/0035273 A1 * | 2/2007 | Kazama et al. | ............. | 320/101 |
| 2007/0252557 A1 * | 11/2007 | Nollet | ............. | 320/128 |
| 2008/0106233 A1 * | 5/2008 | Lai et al. | ............. | 320/107 |
| 2008/0309289 A1 * | 12/2008 | White et al. | ............. | 320/136 |
| 2009/0248331 A1 * | 10/2009 | Barsukov | ............. | 702/63 |
| 2010/0188051 A1 * | 7/2010 | Yamazaki et al. | ............. | 320/148 |

\* cited by examiner

*Primary Examiner* — Drew A Dunn
*Assistant Examiner* — Nathaniel Pelton
(74) *Attorney, Agent, or Firm* — William B. Kempler; Wade J. Brady, III; Frederick J. Telecky, Jr.

(57) ABSTRACT

A battery charger and method for a rechargeable battery pack which includes various elements in series with the cells to be charged, including but not limited to current control FETs, a fuse, current sense resistor, and internal series impedance of the series connected cells to be charged. The charging current Ichg flowing through these series elements reduces the voltage applied to the cells, thus lengthening charging time. A compensation voltage Vcomp, which when added to the nominal charging voltage for the series connected cells overcomes these voltage drops, facilitates more efficient charging while avoiding over-voltage damage to the cells. Three voltages representing substantially all of the voltage drops reducing the charging voltage on the cells, are summed, and the result is a compensation voltage which is utilized to change the nominal charge voltage for the battery to overcome these voltage drops.

16 Claims, 9 Drawing Sheets

BATTERY CHARGE COMPENSATION

BACKGROUND OF THE INVENTION

1. Field of the Invention

This invention relates generally to battery charging, and more specifically to optimizing the charging current and charging voltage applied to a battery pack by compensating for voltage drops within the battery pack, so as to reduce charge time and increase charging efficiency, while keeping battery cell voltages and currents at safe levels to minimize damage to the cells being charged.

2. Description of the Related Art

Rechargeable battery packs (also referred to herein as batteries) are widely used to power portable devices such as laptop computers, cell phones, cameras, and power tools. A battery pack is a series-connected set of one or more cells (hereinafter referred to as cells). It is desirable for such battery packs to have high capacity (generally measured in ampere-hours), to be lightweight, small, and able to be rapidly recharged.

Various cell chemistries have been developed for rechargeable batteries, including lead-acid, nickel-cadmium (NiCd), nickel metal hydride (NiMH), and lithium ion (LiIon). Each chemistry has an optimum charging profile, which often uses multiple charging stages. One common multi-stage profile is the constant-current, constant-voltage (CC-CV) profile, wherein a constant current is first injected into a battery until its terminal voltage rises to a nominal level indicative of a fully-charged state, often referred to as the open circuit voltage (OCV), after which a constant voltage, typically at this value OCV, is applied. In the context of this document, the open circuit voltage OCV shall refer to that optimal charging voltage to be applied to the cells in a battery pack during the CV phase of charging. With this OCV applied by the charger during the CV phase, battery current then decreases to near zero as the battery approaches a fully-charged condition. The constant current during the first phase replenishes much of the battery energy, but if such constant current is continued after the battery voltage rises above its OCV, it will overcharge and destroy the battery, possibly with catastrophic results such as fire or explosion. By switching to a constant voltage for the second phase, the battery current decreases to essentially zero as full charge is approached, self-limiting internal heating and preventing overcharging.

The tolerance of error in charging voltage or current differs with cell chemistry and energy density of the battery. Too high a current during the CC phase, or continuing the CC phase after the cells reach their OCV value, causes overheating and damage to cells. A voltage above OCV during the CV phase typically causes irreversible, damaging chemical changes in the cell. Various protection mechanisms are used in battery chargers and battery packs to preclude such damage. In battery chargers, accurate control of charging current and charging voltage during CC and CV phases respectively is very important. Proper match between the battery to be charged and the charger is also important, and has led to development of smart battery packs which communicate in some manner to the charger the appropriate charge voltage and current given the number of cells in the pack and the capacity of those cells. Protection mechanisms in the battery pack often include a fuse which stops current flow if it exceeds a designated level, charge current monitoring (typically using a low-resistance sense resistor through which charging current flows), and field-effect transistors (FETs) which control the direction of current flow into and out of the pack during charge and discharge respectively.

The fuse, FETs, and sense resistor are typically all in series with each other and with the cells in the battery pack, and so are in the path of the charging current and thus generate a voltage drop proportional to the product of charge current Ichg and combined resistance R (IR drop). The combined internal resistance Rint of the cells in the battery also generates a voltage drop, reducing the actual voltage applied to the cells. For example, during the CV phase and due to combined IR drop of all resistances in series with the cells, a charging voltage applied by the charger to the externally-accessible terminals of the battery pack appears as a lower voltage at the cells, leading to longer charge times and less efficient charging of the cells.

A battery charger with no knowledge of voltage drops internal to the battery pack being charged typically limits its output voltage to the OCV of the cells being charged, to avoid overcharging. Some charger and battery systems, for example a lithium ion (Li-Ion) battery and charger as used with a notebook computer, add a small, fixed compensation voltage during the CV phase to partially compensate for voltage drops in the battery pack. This approach may somewhat improve the charging times and efficiency, but at an added risk of damaging cells due to overcharging. A fixed compensation voltage also cannot account for the changes in battery pack IR drop as charging current changes, or those due to production variation or changes in the batteries.

An apparatus and method for dynamically optimizing the charging current and charging voltage for a battery pack, to reduce charge time without damaging cells or compromising safety, is therefore desirable and is a general object of the present invention.

SUMMARY OF THE INVENTION

An aspect of the invention provides a method and apparatus for measuring, directly or indirectly, the voltage being applied to the cells in a rechargeable battery pack, and modifying the battery charger current or voltage responsive to the measurement of the cell voltage, so as to compensate for internal voltage drops in the battery pack and thereby optimize charging efficiency.

In one embodiment of the invention described in greater detail below, the voltage drops of the elements in series with the cells in a battery pack are measured or computed.

The internal resistance Rint of the cells has been determined over prior charge/discharge cycles by an Impedance Track process, as described in U.S. Pat. No. 6,832,171 B2, which issued on Dec. 14, 2004, to Barsoukov et al., is commonly assigned, and is hereby incorporated by reference herein in its entirety. Charging current Ichg flowing through the cells is also measured, by measuring the voltage drop Vsense across a series connected sense resistor of known value Rsense. A voltage Vint, substantially equal to the voltage drop across the internal impedance of the cells, is computed as the product of current flow Ichg and internal resistance Rint of the cells. The voltage drop Vprot across the protection devices comprising the series connected FETs and fuse is also measured. A compensation voltage value Vcomp is then computed by summing the voltages Vprot, Vint, and Vsense:

$$Vcomp = Vprot + Vint + Vsense$$

This compensation voltage, when added to the OCV for the cells being charged, causes the optimal charging voltage to be applied to the cells by compensating for IR voltage drops within the battery pack and in series with the cells being charged.

The desired charging voltage Vchg to be applied to the battery pack terminals is thus Vchg=OCV+Vcomp. The compensation voltage Vcomp, or data representative of the voltage Vcomp, is coupled from the battery pack to the charger, which adds Vcomp to its nominal charging voltage (OCV for the cells being charged) to provide this desired Vchg. As the battery pack approaches full charge and charging current decreases, the desired compensation voltage Vcomp decreases, since the IR drops Vprot, Vint, and Vsense are proportional to current, and the charger modifies its charging voltage accordingly. The result is that an optimal charging voltage is applied to the cells, compensating for voltage drops across elements in series with the cells.

In another embodiment of the invention, the internal impedance Rint of the cells is computed during prior charge/discharge cycles by the Impedance Track process described above. This internal impedance is multiplied by the measured current flow Ichg, to yield a voltage value Vint representative of the internal voltage drop across the internal resistance of the cells. The nominal cells open circuit voltage (OCV) for the state of charge and current flow is determined by lookup table in the Impedance Track circuitry. This nominal OCV is then summed with Vint, yielding a value for the desired charging voltage Vchg to be applied to the cells, which is compared with the actual voltage Vcells measured across the cells. The result of this comparison is communicated to the charger as a step-up, step-down command, whereby, in an iterative process, the charging voltage approaches the optimal value. Because the process described modifies the charger voltage using a stepwise feedback process rather than by communicating to the charger a compensation voltage or an absolute voltage to be generated, voltage drops in series with the cells are compensated for without directly measuring or computing these voltage drops.

Yet another embodiment measures and sums the voltage drops Vint, Vprot, and Vsense, and applies this summed analog voltage to a compensation input of the charger, which modifies its output to compensate for IR drops between the charger and the cells.

A significant advantage of the described embodiments is the increase in charging efficiency of the battery pack and shortened charge times, due to the longer time spent in the CC phase of charging (during which the most efficient charging takes place) and the more accurate control of charge voltage during the CV phase of charging. By accurately and variably compensating for IR drops between the charger and cells, the charging voltage applied to the cells is substantially kept as high as possible without exceeding the desired OCV of the cells. Communication of the compensation data between battery pack and charger may be digital or analog.

Further benefits and advantages will become apparent to those skilled in the art to which the invention relates.

DESCRIPTION OF THE VIEWS OF THE DRAWINGS

Throughout the drawings, like elements are referred to by like numerals.

DETAILED DESCRIPTION

Figure 1:
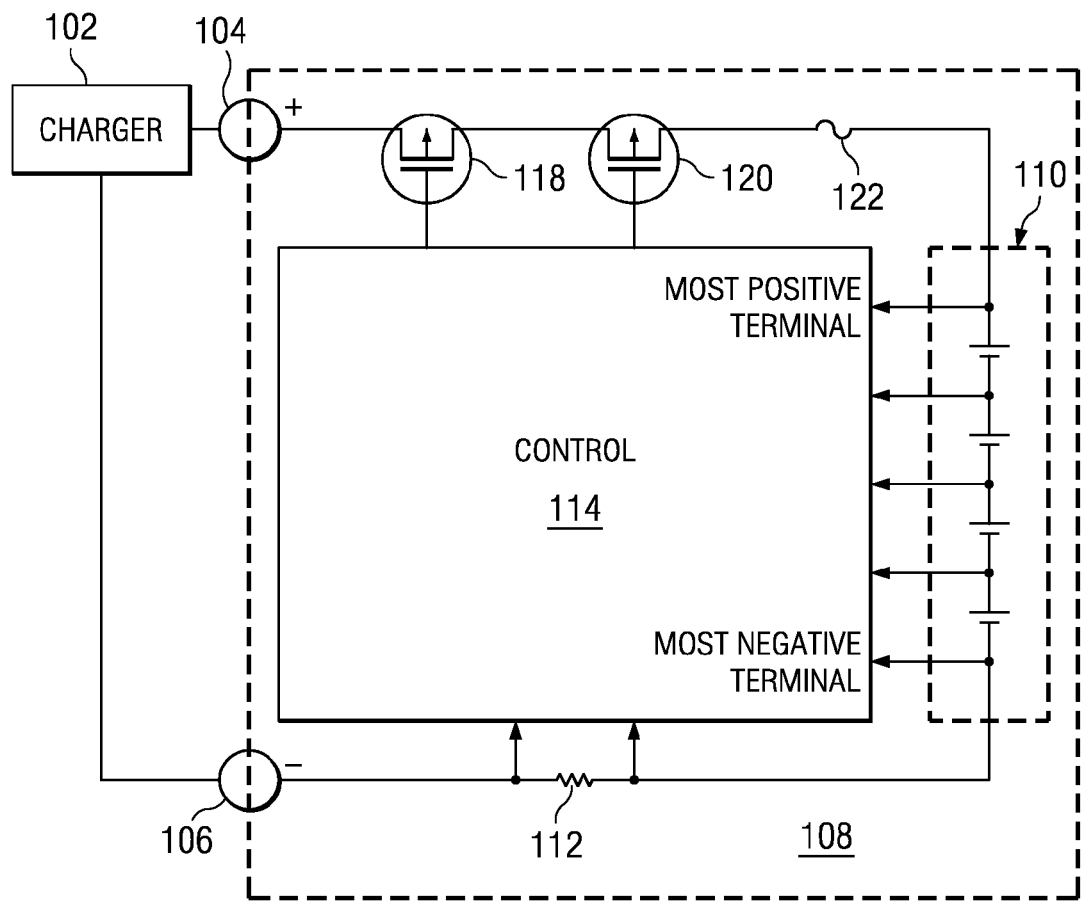
FIG. 1 (prior art) shows a battery charger coupled to a battery pack having switching FETs, a protection element, series connected cells, and current sense resistor.

In FIG. 1, a charger 102 has a positive output coupled to the positive terminal 104 of battery pack 108, and a negative output coupled to the negative terminal 106 of the battery pack. Switching and protection elements comprise charge FET 118, discharge FET 120, and fuse 122. FET 118 has a first terminal coupled to the positive terminal 104, a second terminal coupled to the first terminal of FET 120, and a third control terminal. FET 120 has a first terminal coupled to the second terminal of FET 118, second terminal coupled to a first terminal of fuse 122, and a third control terminal. The second terminal of fuse 122 is coupled to a first terminal of cells 110 which is the most positive voltage of cells 110. Another terminal of cells 110 which is the most negative voltage of cells 110 is coupled to a first terminal of sense resistor 112. A second terminal of sense resistor 112 is coupled to the negative terminal 106. A control circuit 114 has a first terminal coupled to the third control terminal of FET 118, a second terminal coupled to the third control terminal of FET 120, a third terminal coupled to the first terminal of cells 110, a fourth terminal coupled to the second terminal of cells 110, a fifth terminal coupled to the first terminal of sense resistor 112, and a sixth terminal coupled to the second terminal of sense resistor 112

In operation and in a known manner charge FET 118 and discharge FET 120 are turned on during charge or discharge, allowing current to flow to or from cells 110, respectively, and preventing current flow through the parasitic diodes in FET 118 and FET 120. Current from the negative terminal 106 flows through sense resistor 112 to the most negative terminal of cells 110. The voltage across sense resistor 112 is coupled to terminals of control 114, so that control 114 is able to compute discharge current flow from cells 110. The voltage(s) across cells 110, individually or as a group, are also coupled to terminals of control 114. In the event of excessive current flow during charge or discharge, as signaled by the voltage across sense resistor 112 exceeding a threshold value, control 114 may shut off FET 118 and or FET 120 to interrupt current flow to protect cells 110. Discharge current may also be stopped when the voltage across cells 110 reaches a low voltage threshold indicative of full discharge, thereby preventing over-discharge of the cells 110. In a similar manner, charge current may be stopped when the voltage across cells 110 reaches a high voltage threshold indicative of full charge, thereby preventing over-charging of the cells 110. Fuse 122 provides additional over current protection.

Other known functions are often included in control 114, such as a "gas gauge" function which integrates over time the discharge current, as measured by sense resistor 112, so as to provide a measure of ampere-hours of discharge. By comparing the ampere-hours of discharge with the known ampere-hour capacity of the fully-charged battery, an indication of remaining battery capacity is generated. Integration of charging current may also be performed to gauge the state of charge.

Those skilled in the art will recognize that as charging current flows into cells 110 through the series-connected FETs, fuse, sense resistor, and internal resistance of cells 110, a cumulative voltage drop is created which is proportional to the combined series resistance and charging current flow. This voltage drop, because of the series connection of the elements causing it, decreases the voltage applied to the cells 110. If not compensated for, the reduced voltage at cells 110 due to this voltage drop leads to longer charge time and less efficient charging.

Figure 2:
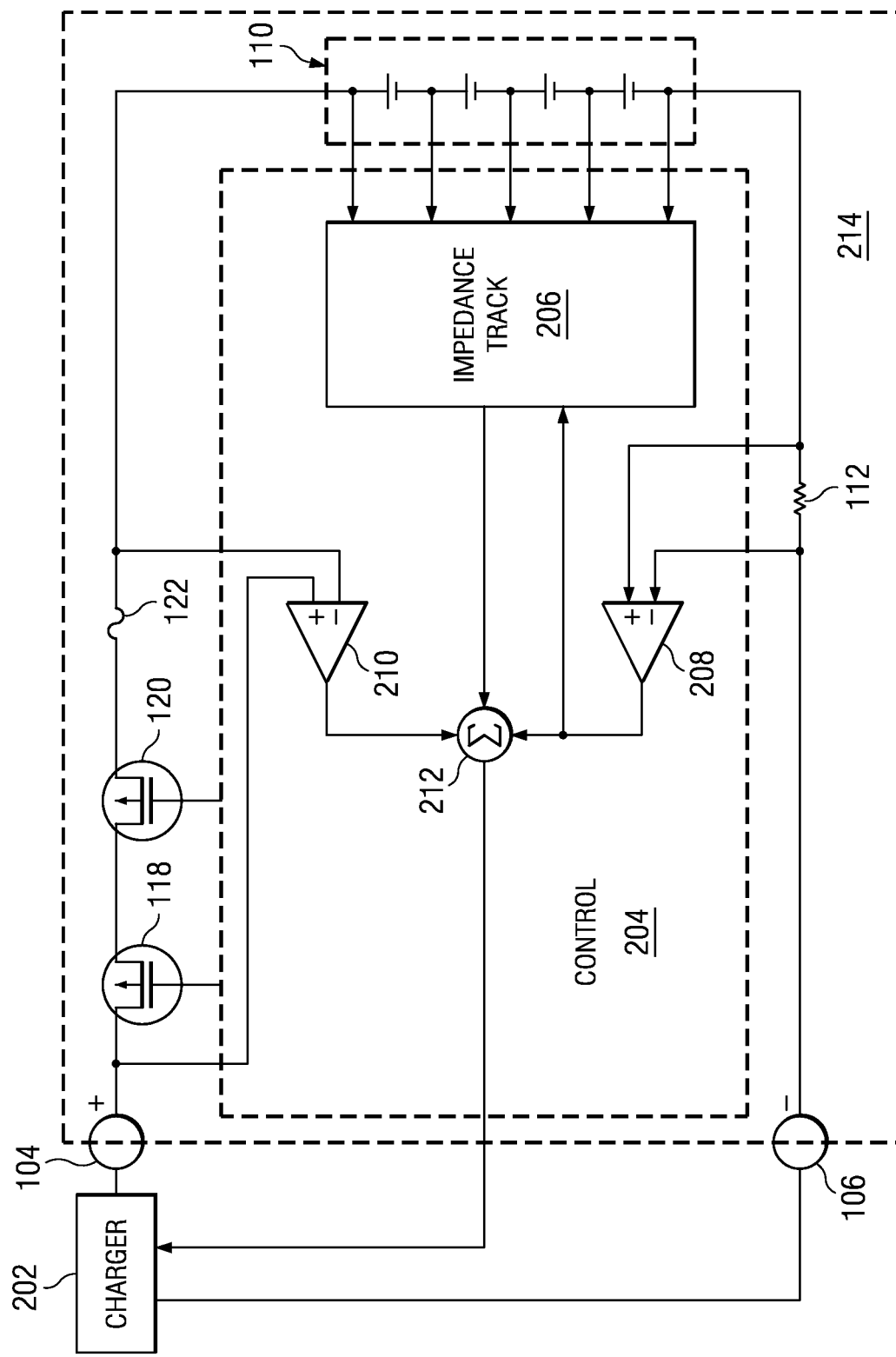
FIG. 2 shows a rechargeable battery pack having switching FETs, a protection element, series connected cells, a current sense resistor, and a circuit to generate a voltage Vcomp which is coupled to the battery charger, where it is added to the nominal charge voltage to compensate for voltage drops between the charger and the cells.

In FIG. 2, in a topology substantially equivalent to that of FIG. 1, a charger 202 has a positive output coupled to the positive terminal 104 of battery pack 214, and a negative output coupled to the negative terminal 106 of the battery pack. Switching and protection elements comprise charge FET 118, discharge FET 120, and fuse 122. FET 118 has a first terminal coupled to the positive terminal 104, a second terminal coupled to the first terminal of FET 120, and a third control terminal. FET 120 has a first terminal coupled to the second terminal of FET 118, second terminal coupled to a first terminal of fuse 122, and a third control terminal. The second terminal of fuse 122 is coupled to a first terminal of the cells 110. A second terminal of cells 110 is coupled to a first terminal of sense resistor 112. A second terminal of sense resistor 112 is coupled to the negative terminal 106. A control circuit 204 has a first terminal coupled to the third control terminal of FET 118, a second terminal coupled to the third control terminal of FET 120, a third terminal coupled to the first terminal of cells 110, a fourth terminal coupled to the second terminal of cells 110, a fifth terminal coupled to the first terminal of sense resistor 112, and a sixth terminal coupled to the second terminal of sense resistor 112.

Control 204 retains the functionality described for control 114, and adds circuitry in accordance with an embodiment of the invention to compensate, during charging, for the voltage drop across switching FETs, protection fuse, sense resistor, and internal impedance of the cells. Differential amplifier 210 has a first input coupled to the first terminal of FET 118, a second input coupled to the second terminal of fuse 122, and an output coupled to a first input of a summer 212. An Impedance Track circuit 206 has a first input coupled to the first terminal of cells 110, a second input coupled to the second terminal of cells 110, a third input, and an output coupled to a second terminal of summer 212. In some implementations, Impedance Track circuit 206 has a plurality of additional inputs between the first input and second input, as shown in FIG. 2, coupled to the positive and negative terminals of each cell in the group of cells 110. A differential amplifier 208 has a first input coupled to the first terminal of sense resistor 112, a second input coupled to the second terminal of sense resistor 112, and an output coupled to a third input of summer 212 and to the third input of Impedance Track 206. The output of summer 212 is coupled to the compensation input of battery charger 202.

In operation and during charging, amplifier 210 generates an output voltage Vprot proportional to the voltage drop across the series-connected FET 118, FET 120, and fuse 122. Amplifier 208 generates an output voltage Vsense proportional to the voltage drop across sense resistor 112. Impedance track 206, as described in U.S. Pat. No. 6,832,171 B2, computes the series impedance of cells 110 based on prior charge/discharge cycles, and multiplies this series impedance by the current flow through cells 110 as represented by the output voltage of amplifier 208.

The output of Impedance Track 206 is thus a voltage Vint proportional to and representative of the voltage drop across the internal impedance of cells 110; the output of amplifier 210 is a voltage Vprot proportional to and representative of the voltage drop across the series-connected protection elements FET 118, FET 120, and fuse 122; and the output of amplifier 208 is a voltage Vsense proportional to and representative of the voltage drop across the sense resistor 112. These three voltages are summed in summer 212, and the output of summer 212 is a voltage Vcomp which represents the desired compensation voltage which will overcome the voltage drops described above when added to the nominal charge voltage OCV for the chemistry and number of cells in cells 110. This compensation voltage Vcomp is coupled to the compensation input of charger 202, which increases its charging voltage by the compensation voltage amount so as to provide the optimal charge voltage to the cells 110.

Figure 3:
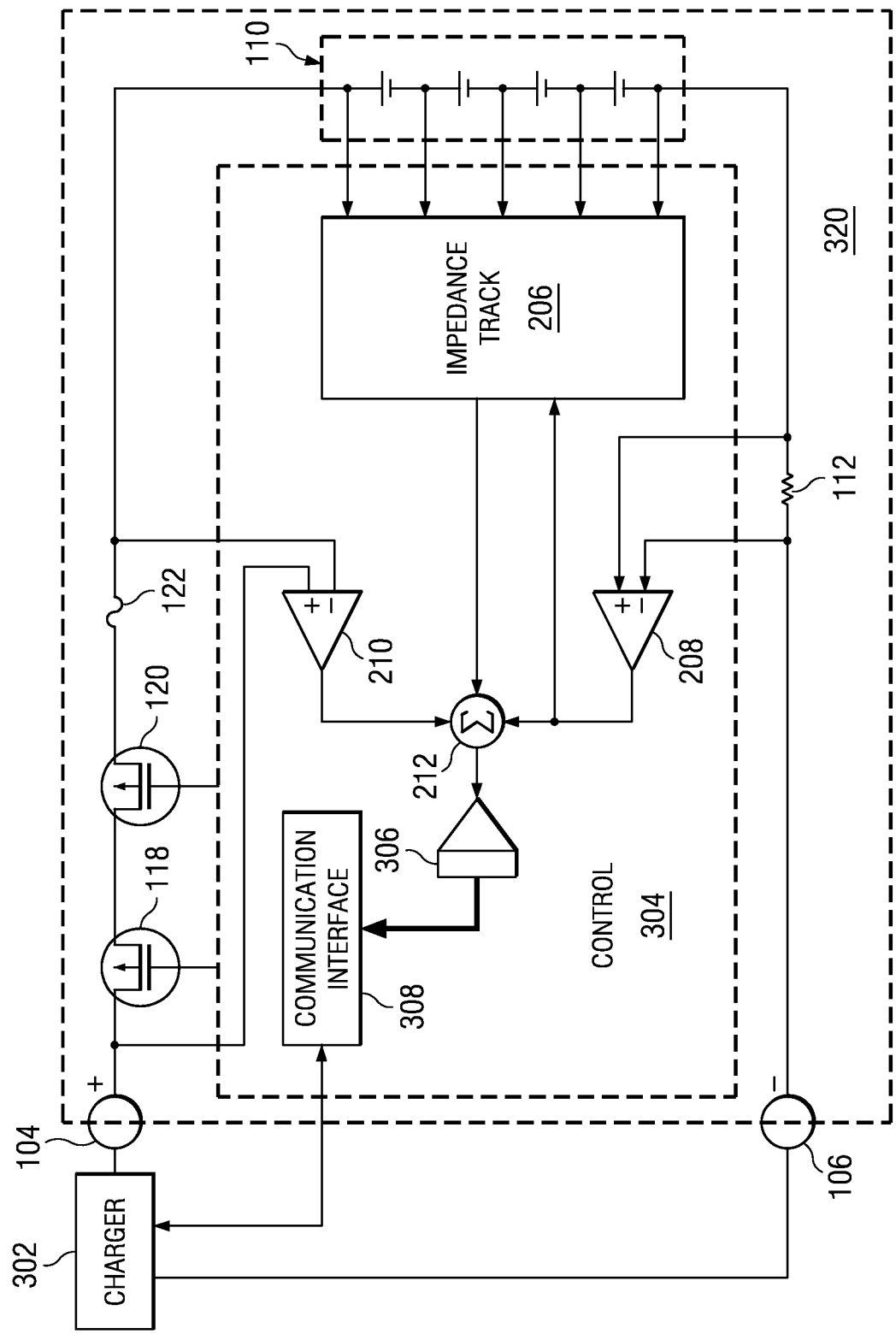
FIG. 3 shows a battery pack substantially equivalent to that of FIG. 2, but having a digital rather than analog interface between the battery pack and charger.

In FIG. 3, battery pack 320 has control 304 providing another embodiment of the invention. Rather than having an analog coupling between the battery pack and charger, the embodiment described in FIG. 3 has a digital communication link between battery pack and charger. The topology of the system of FIG. 3 is substantially equivalent to that of FIG. 2 except as follows.

The analog output of summer 212 is not coupled to charger 302, but is coupled instead to the input of an analog to digital converter (ADC) 306. The output of ADC 306 is coupled to the input of communication interface 308, which has a bidirectional data interface coupled to a corresponding digital interface on charger 302.

In operation, a digital signal representing the desired compensation voltage is coupled from battery pack 320 to charger 302, which adjusts its charging voltage appropriately as described above.

Figure 4:
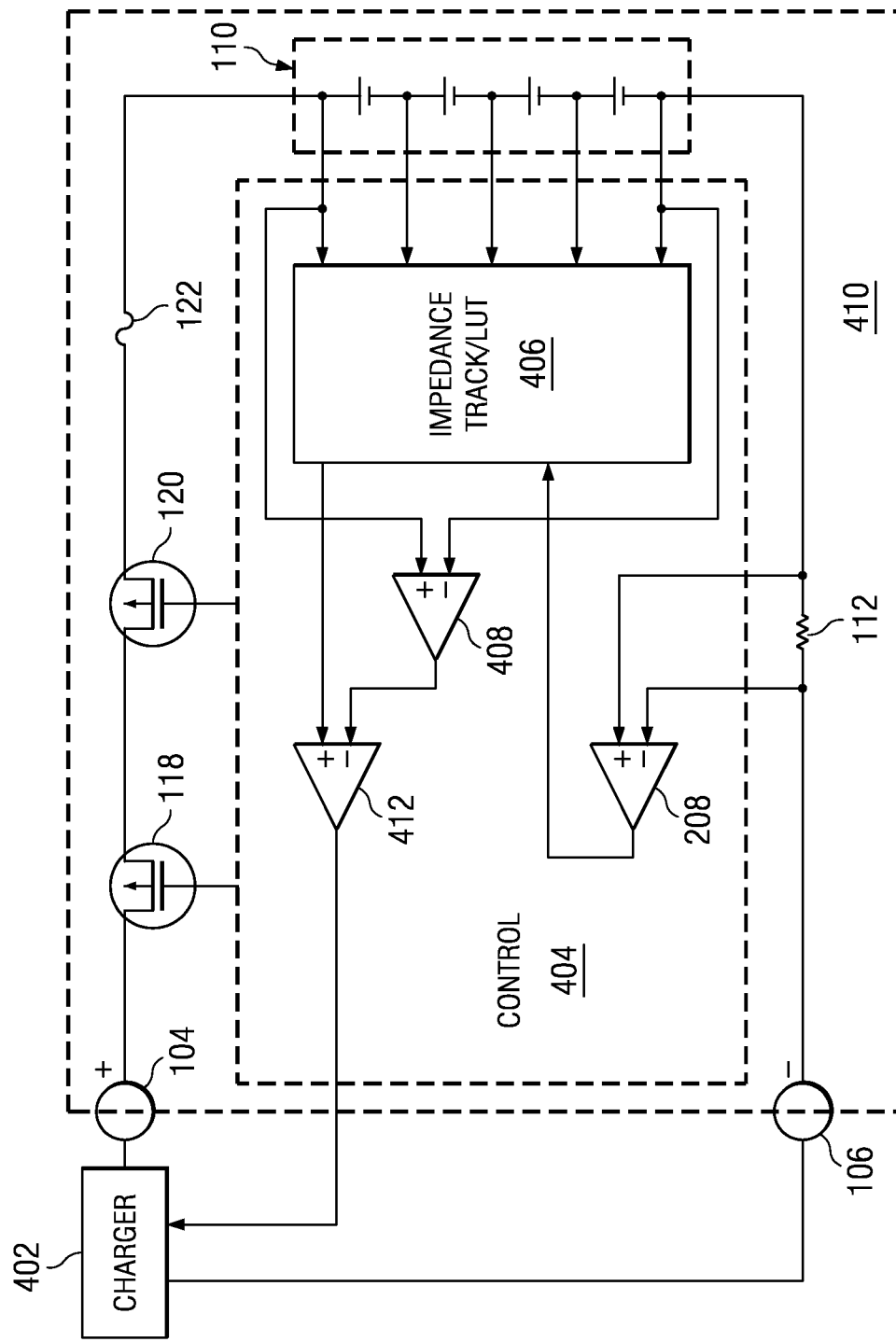
FIG. 4 is a block diagram of another embodiment of the system shown in FIG. 2, in which the actual charge voltage across cells is compared with a desired charge voltage, and an increase/decrease signal is coupled to the charger, which modifies its output voltage in small steps responsive to the increase/decrease signal.

In FIG. 4, yet another embodiment of the invention generates and couples to the charger an increase/decrease command, rather than a compensation voltage value. A charger 402 has a positive output coupled to the positive terminal 104 of battery pack 410, and a negative output coupled to the negative terminal 106 of the battery pack. Switching and protection elements comprise charge FET 118, discharge FET 120, and fuse 122. FET 118 has a first terminal coupled to the positive terminal 104, a second terminal coupled to the first terminal of FET 120, and a third control terminal. FET 120 has a first terminal coupled to the second terminal of FET 118, second terminal coupled to a first terminal of fuse 122, and a third control terminal. The second terminal of fuse 122 is coupled to a first terminal of the cells 110. A second terminal of cells 110 is coupled to a first terminal of sense resistor 112. A second terminal of sense resistor 112 is coupled to the negative terminal 106. A control 404 has a first terminal coupled to the third control terminal of FET 118, a second terminal coupled to the third control terminal of FET 120, a third terminal coupled to the first terminal of cells 110, a fourth terminal coupled to the second terminal of cells 110, a fifth terminal coupled to the first terminal of sense resistor 112, and a sixth terminal coupled to the second terminal of sense resistor 112.

Control 404 comprises Impedance Track with look-up table (LUT) 406, differential amplifier 408, differential amplifier 208, and comparator 412. The third terminal of control 404 is coupled to the first terminal of cells 110, to a first input of Impedance Track/lookup table 406, and to a first input of differential amplifier 408. The fourth terminal of control 404 is coupled to the second terminal of cells 110, to a second input of Impedance Track/lookup table 406, and to a second input of differential amplifier 408. The output of Impedance Track/lookup table 406 is coupled to the first input of comparator 412. The output of differential amplifier 408 is coupled to the second input of comparator 412. The fifth terminal of control 404 is coupled to a first input of differential amplifier 208 and to the first terminal of sense resistor 112. The sixth terminal of control 404 is coupled to a second input of differential amplifier 208 and the second terminal of sense resistor 112. The output of differential amplifier 208 is coupled to a third input of Impedance Track/lookup table 406. As noted above, in the case where cells 110 is a plurality of cells, a plurality of inputs to Impedance Track/lookup table 406 are coupled to the individual cells in the plurality of cells.

In operation, a voltage proportional to charge current is developed across sense resistor 112, and is amplified by differential amplifier 208 and coupled to the third input of Impedance Track/lookup table 406. The voltage across cells 110 is coupled to the first and second inputs of Impedance Track/lookup table 406. Having these inputs representing charging current and cells voltage (which includes the voltage drop across the internal impedance of cells), Impedance Track/lookup table 406 determines, as described in U.S. Pat. No. 6,832,171 B2, the state of charge of cells 110, and inputs to a look-up table this state of charge. The output of the lookup table is a value representing the desired charge voltage for the present state of charge, including compensation for the internal voltage drop of the cells in cells 110. This number is converted to an analog voltage and coupled to the output of Impedance Track/lookup table 406. The first input of comparator 412 is thus the desired charge voltage across cells 110 for the present state of charge. The second input of comparator 412 is the actual voltage across cells 110. The output of comparator 412 is thus an increase/decrease signal indicative of whether the present charging voltage is below or above, respectively, the desired voltage. This increase/decrease signal is coupled to the charger 402. In a periodic manner, charger 402 examines this increase/decrease signal and adjusts appropriately the output voltage, in relatively small steps, until the increase/decrease signal changes state, indicating the charging voltage is at or near the desired voltage. Continued periodic examination and adjustment then keeps the charge voltage near the optimal level.

It will be obvious to those skilled in the art that this step-wise adjustment of voltage, in the feedback loop described, will automatically compensate for voltage drops in the battery pack which are not directly measured, such as those across FET 118, FET 120, fuse 122, sense resistor 112, and even trace resistance of circuit boards or other wiring.

Figure 5:
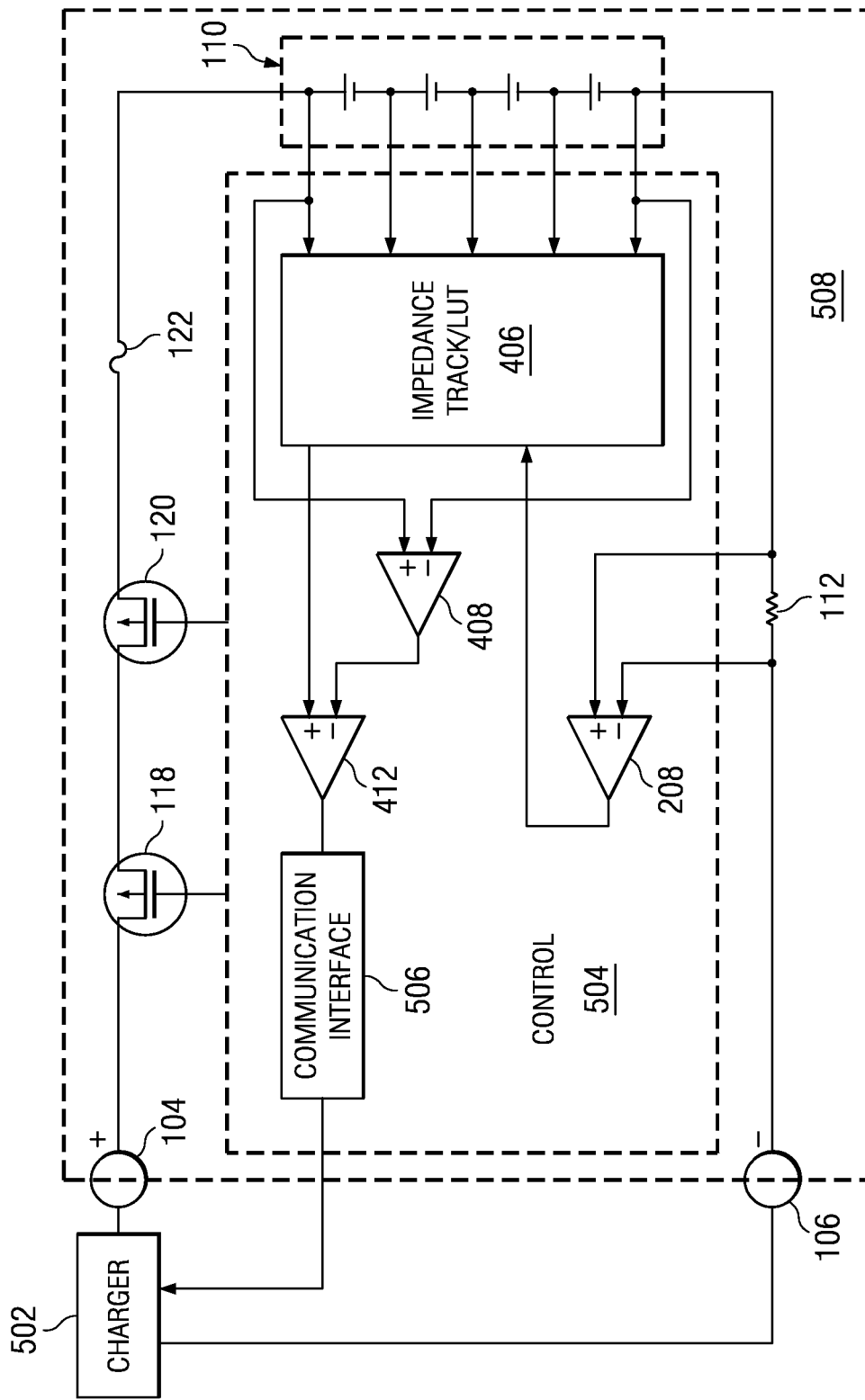
FIG. 5 shows a battery pack substantially equivalent to that of FIG. 4, but having a digital rather than analog interface between the battery pack and charger.

In FIG. 5, battery pack 508 has control 504 providing still another embodiment of the invention. Rather than having an analog coupling between the battery pack and charger, the embodiment described in FIG. 5 has a digital communication link between battery pack and charger. The topology of the system of FIG. 5 is substantially equivalent to that of FIG. 4 except as follows.

The output of comparator 412 is not coupled to charger 502, but is coupled instead to the input of communication interface 506, which has a bidirectional data interface coupled to a corresponding digital interface on charger 502.

In operation, a digital signal representing the increase/decrease command is coupled from battery pack 508 to charger 502, which adjusts its charging voltage appropriately in a step wise manner as described above.

Figure 6:
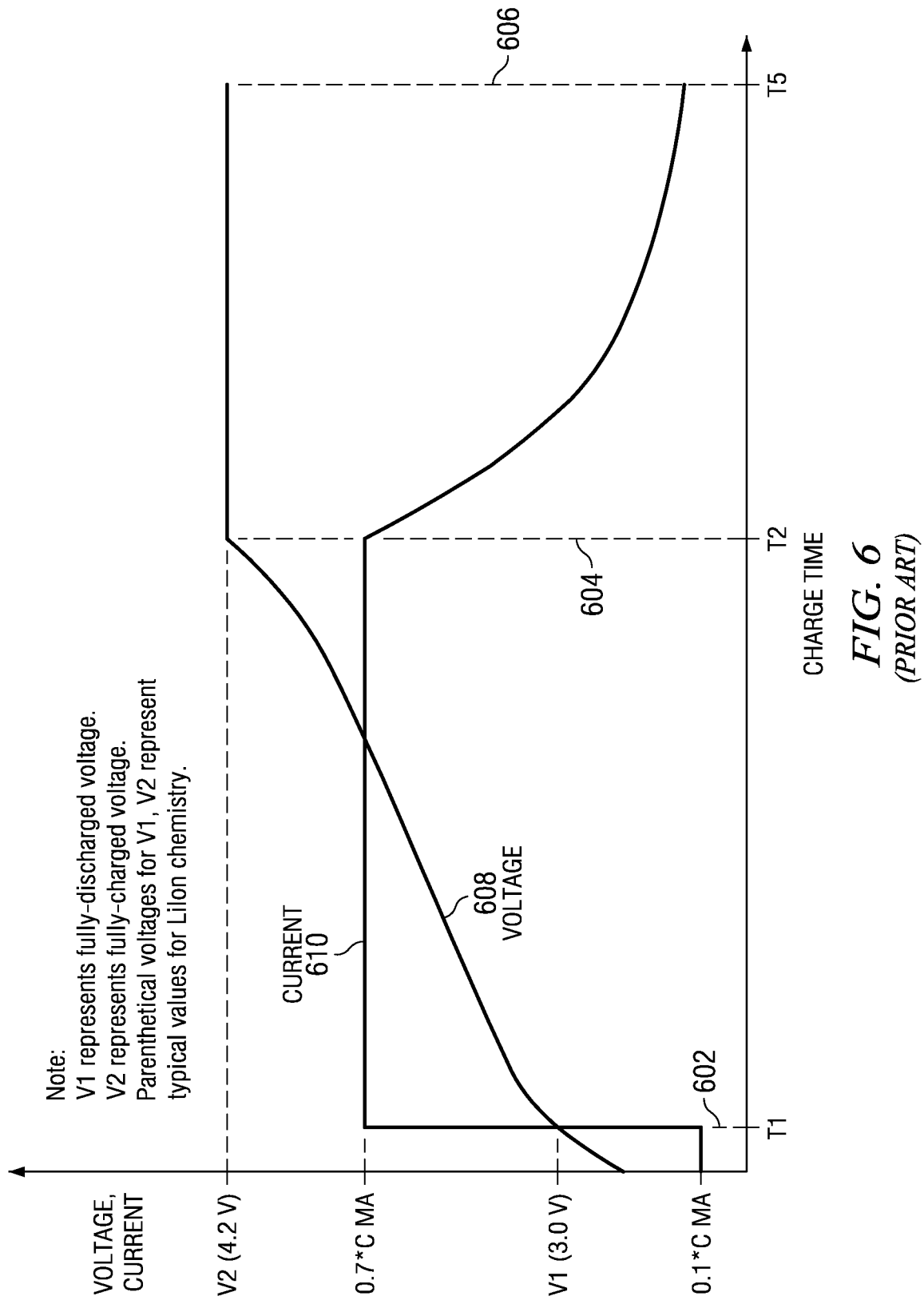
FIG. 6 (prior art) is a graph of the charging profile of a prior art system.

In FIG. 6, a graph of a prior art charging profile shows charging voltage and current versus time. In this graph, the voltage is that measured across the battery pack terminals (positive terminal 104 and negative terminal 106 of the battery shown in FIG. 1). A current of typically 0.1*C mA (where C is the ampere-hour capacity of the battery) is applied from time zero (start of charging) until the battery voltage reaches that voltage V1 indicative of a fully-discharged state, for example 3.0V for a LiIon cell, at time T1 602 as shown. Charging current is then increased and held constant at typically 0.7*C mA, until the voltage on the battery pack, shown by trace 608, reaches that voltage V2 indicative of a fully-charged state, for example 4.2V for a LiIon cell, at time T2 604. This voltage at full charge is often referred to as the open-circuit voltage or OCV. The time from time T1 to T2 is referred to as the constant current (CC) phase of charging.

At time T2, the constant voltage (CV) phase is entered. From time T2 604 to T5 606, the charging voltage applied to the battery is held constant at the OCV, for example 4.2V in the case of LiIon chemistry, and the battery current, shown by trace 610, gradually decreases as the battery continues charging. Charging ends at time T5 606, when the charging current has decreased to a predetermined level.

During the CV phase, the actual voltage applied to the cells 110 is lower than desired due to the voltage drops described above across protection elements, internal cell impedance, and sense resistance. This causes the charge time to T5 to be longer than it would be if the charging voltage during CV phase was optimized with compensation.

Figure 7:
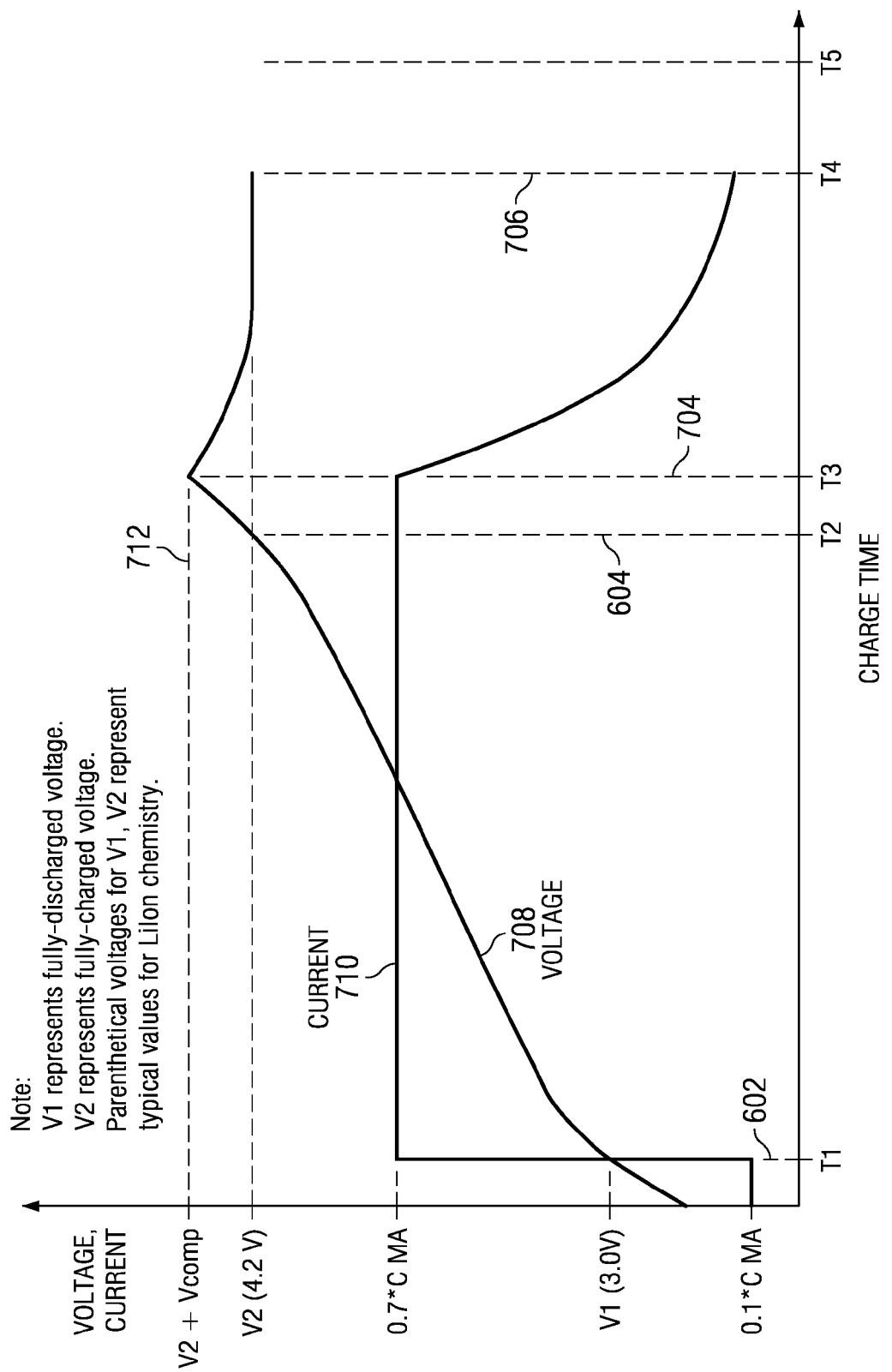
FIG. 7 is a graph of the charging profile of a preferred embodiment of the invention, showing the reduction in charging time when compensation is used.

In FIG. 7, a graph of a charging profile incorporating an embodiment of the invention shows charging voltage and current versus time. In this graph, the voltage is that measured across the battery pack terminals (positive terminal 104 and negative terminal 106 of the battery shown in FIG. 2, FIG. 3, or FIG. 4). As in the prior art described above, a current of typically 0.1*C mA (where C is the ampere-hour capacity of the battery) is applied from time zero (start of charging) until the battery voltage reaches that voltage V1 indicative of a fully-discharged state, for example 3.0V for a LiIon cell, at time T1 602 as shown. Charging current is then increased and held constant at typically 0.7*C mA, until the voltage on the battery pack, shown by trace 708, reaches that voltage V2 indicative of a fully-charged state, for example 4.2V for a LiIon cell, plus Vcomp, as shown by voltage level 712, at time T3 704. The time from time T1 to T3 is referred to as the constant current (CC) phase of charging, and is longer than in the prior art phase, since the voltage on the battery is allowed to rise above the OCV level by the amount Vcomp.

At time T3 704 the constant voltage (CV) phase is entered. From time T3 704 to T4 706, the charging voltage is held constant at V2+Vcomp, for example 4.2V+Vcomp in the case of LiIon chemistry. The battery current, shown by trace 710, gradually decreases as the battery continues charging. Note that the charging voltage applied to the battery gradually decreases between time T3 and time T4, as the compensation voltage Vcomp decreases. Charging ends at time T4 706, when the charging current has decreased to a predetermined level.

During the CV phase in FIG. 7, the actual voltage applied to the cells is much closer to the desired voltage because the voltage drops across protection elements, internal cell impedance, and sense resistance are compensated by the voltage Vcomp. The time difference between time T5 (the same in FIG. 6 and FIG. 7) and time T4 (FIG. 7) represents the reduction in charging time attributable to the invention.

While specific voltages and current levels for the charging phases are shown in FIG. 6 and FIG. 7, those skilled in the art will recognize that other voltages and currents will be appropriate for differing battery pack configurations, chemistries, and systems. In any case, the increased charging voltage during the CV phase shortens the charging time.

Figure 8:
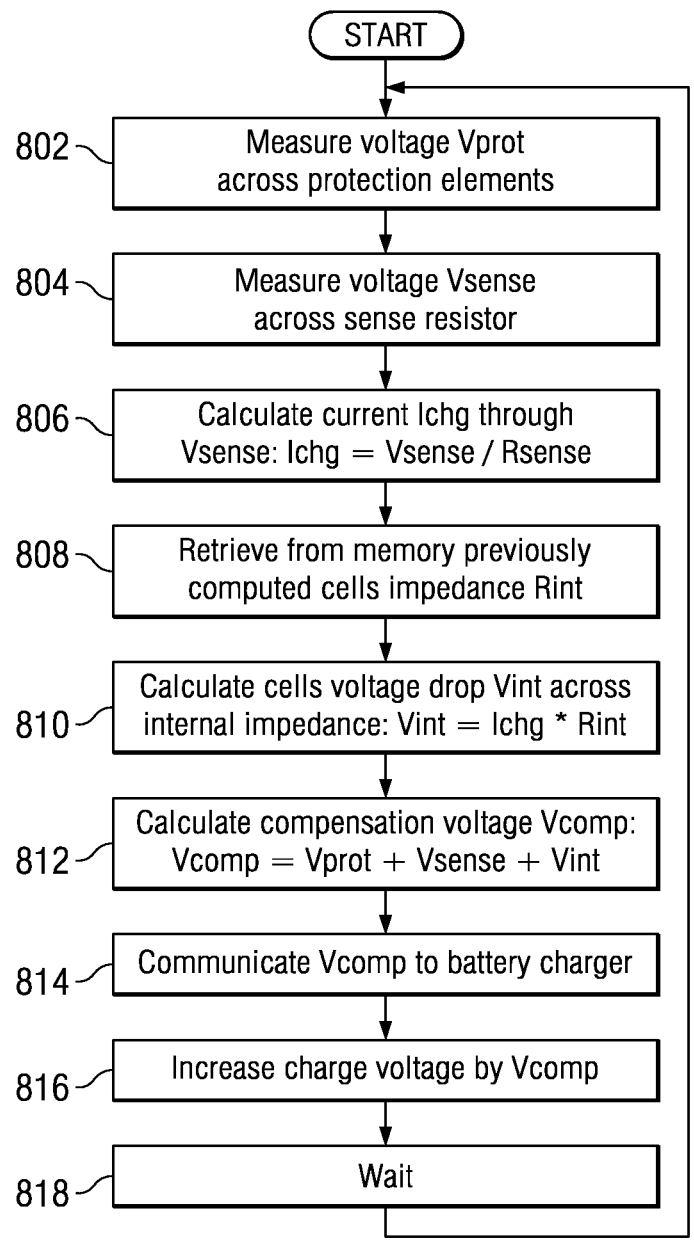
FIG. 8 is a flow chart of the method of operation of one embodiment.

In FIG. 8, the method of operation for one of the embodiments of the invention is shown. This method presumes protection elements as described above, such as control transistors, current limiting device, and sense resistor, are in series with the cells to be charged, and that further the cells to be charged have internal impedance which has been computed by known methods described in U.S. Pat. No. 6,832,171 B2

At step 802, the voltage Vprot across the series connected protection elements (control transistors, current limiting device) is measured. At step 804 the voltage Vsense across a sense resistor is measured. At step 806, the current Ichg through resistor Rsense is computed by dividing the measured Vsense by the known Rsense. Current Ichg is substantially equivalent to the current flowing through the series connected cells because of the series connection of elements. At step 808, the internal impedance of the cells, having been computed by the method described by U.S. Pat. No. 6,832,171 B2, is retrieved from memory. At step 810, the voltage drop Vint across the series connected cells is calculated by multiplying Rint by Ichg. At step 812, the compensation voltage Vcomp is calculated by summing Vprot plus Vsense plus Vint, to yield that compensating voltage which when added to the nominal charge voltage will overcome the voltage drops due to charge current flowing in the protection element, sense resistor, and internal cells impedance. At step 814, this compensation voltage Vcomp is communicated to the battery charger, as an analog voltage or digital message. At step 816, the battery charger changes its output voltage by Vcomp. At step 818, a suitable wait interval occurs, so as to control the update rate of battery charger voltage changes. At the end of wait step 818, flow reverts to step 802 at which point the process repeats, measuring new values of Vprot, Vsense, and Vint caused by the decrease in charging current as the cells approach a fully-charged condition.

Figure 9:
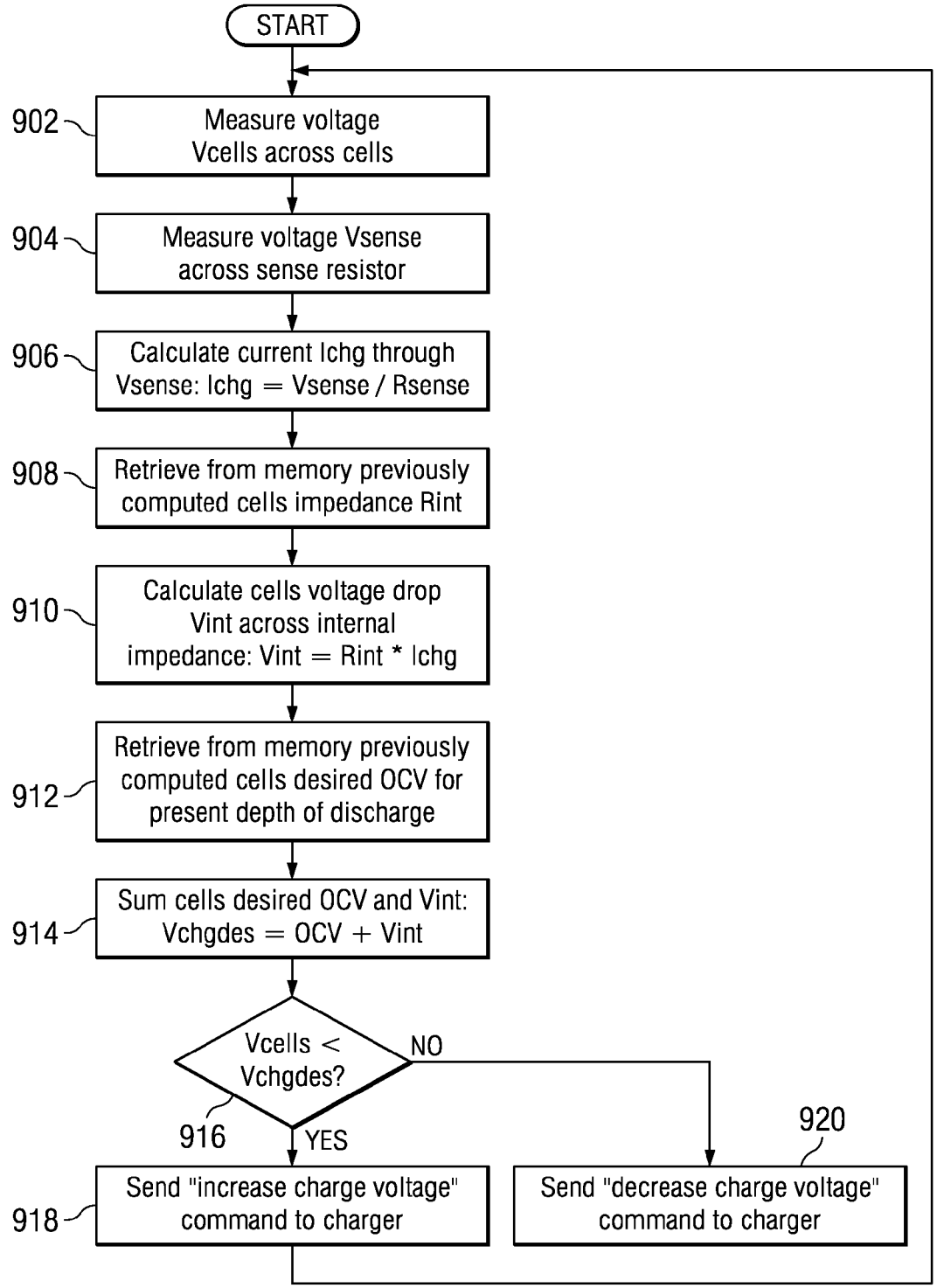
FIG. 9 is a flow chart of the method of operation of another embodiment.

In FIG. 9, the method of operation of another embodiment of the invention is illustrated in a flow chart. As in the method described in FIG. 8, the method of FIG. 9 is applicable when the battery pack being charged has one or more of protection elements, sense resistor, and internal impedance of cells in series with the cells to be charged.

At step 902, the process begins by measuring the voltage Vcells across the series connected cells being charged. Step 904 measures the voltage Vsense across the sense resistor Rsense. Step 906 calculates the current Ichg through resistor Rsense by dividing Vsense by Rsense. Current Ichg is substantially equivalent to the current flowing through the series connected cells because of the series connection of elements. At step 908, the internal impedance Rint of the cells is retrieved from memory, having been previously computed and stored using the methods described in U.S. Pat. No. 6,832,171 B2. At step 910, the voltage drop Vint across the cells due to the charging current and internal impedance is calculated by multiplying Rint by Ichg. Step 912 retrieves from memory the desired open circuit voltage (OCV) for the state of charge of the cells, computed in a manner described in U.S. Pat. No. 6,832,171 B2. At step 914, the desired OCV is added to Vint to yield that desired charge voltage Vchgdes which will compensate for voltage drop in the cells due to internal impedance. At step 916, the voltage Vchgdes (desired voltage across cells) is compared with voltage Vcells (measured voltage across cells). If Vcells is less than Vchgdes, an "increase charging voltage" message is sent at step 918 to the charger, which increments the charging voltage by a small amount. If at step 916 Vcells is found to be greater than Vchgdes, a "decrease charging voltage" message is sent at step 920 to the charger, which decrements the charging voltage by a small amount. After step 918 or step 920, the process repeats at step 902, causing the charging voltage to approach the desired charging voltage in steps.

Those skilled in the art to which the invention relates will also appreciate that yet other substitutions and modifications can be made to the described embodiments, without departing from the spirit and scope of the invention as described by the claims below. For example, many alternative ways of communicating either a compensation voltage value or the desired total charge voltage value to a battery charger may be envisioned, using digital communication or simple analog coupling. Exclusion of some elements of the summation for the compensation voltage may be desirable if those excluded elements are small, such as the voltage across sense resistor 112 if it is of a very low value. In another alternative embodiment, a value representing the nominal charge voltage for the chemistry and number of cells being charged may be summed with the compensation voltage in the battery pack rather than the charger.

Accordingly, in one aspect, the invention provides a battery charger compensation apparatus, comprising: (a) a first differential amplifier having a first input terminal coupled to a first end of series-connected protection elements, and having a second input terminal coupled to a second end of said series-connected protection elements, and having an output terminal, whereby the output of said first differential amplifier is a signal proportional to the voltage drop across said series-connected protection elements; (b) a second differential amplifier having a first input terminal coupled to a first end of a current sense resistor, and having a second input terminal coupled to a second end of said current sense resistor, and having an output terminal; whereby the output of said second differential amplifier is a signal proportional to the voltage drop across said current sense resistor; (c) an impedance tracking circuit having a first input terminal coupled to the positive end of the cell to be charged, and having a second input terminal coupled to the negative end of said cell, and having a third terminal coupled to the output terminal of said second differential amplifier, and having an output terminal, whereby the output voltage of said impedance tracking circuit is a signal proportional to the voltage drop across the internal impedance of said cell; (d) a summer having a first input terminal coupled to said output terminal of said first differential amplifier, a second input terminal coupled to said output terminal of said second differential amplifier, and a third input terminal coupled to said output terminal of said impedance tracking circuit, and an output terminal, whereby the output terminal of said summer is proportional to the sum of said voltage drop across said series-connected protection elements, said voltage drop across said current sense resistor, and said signal proportional to the voltage drop across the internal impedance of said cell; and (e) an analog coupling between said output terminal of said summer and the compensation input of a battery charger; whereby a compensation voltage which is the sum of said voltage drop across said series-connected protection elements, said voltage drop across said current sense resistor, and said voltage drop across the internal impedance of said cell is generated and coupled to the battery charger, which then increases its output voltage by an amount substantially equal to said compensation voltage.

In certain embodiments, the apparatus may include an analog-to-digital converter (ADC) having an analog input terminal coupled to said output terminal of said summer, and having a digital output terminal; and a communication interface having an input terminal coupled to said output terminal of said ADC, and having an output terminal coupled to a battery charger; whereby a compensation voltage which is the sum of said voltage drop across said series-connected protection elements, said voltage drop across said current sense resistor, and said voltage drop across the internal impedance of said cells is generated and communicated via a digital coupling to the battery charger, which then increases its output voltage by an amount substantially equal to said compensation voltage.

In certain embodiments, the apparatus may include a storage element containing a value which is the nominal desired cell voltage for said cell; and a fourth input terminal to said summer coupled to said storage element; whereby a desired total charging voltage, which is the sum of said voltage drop across said series-connected protection elements, said voltage drop across said current sense resistor, said nominal desired cell voltage, and said voltage drop across the internal impedance of said cell, is generated and communicated to the battery charger, which adjusts its output voltage to substantially equal said desired total charging voltage.

In certain embodiments, the impedance tracking circuit has a plurality of input terminals coupled to the positive and negative terminals of each cell in a plurality of cells, whereby a plurality of cells in series may be charged rather than a single cell.

In another aspect, the invention provides an apparatus for generating increase and decrease voltage commands to a battery charger, comprising: (a) a first differential amplifier having a first input terminal coupled to a first end of cells being charged and having a second input terminal coupled to a second end of said cells being charged, and having an output terminal, whereby the output terminal of said first differential amplifier is a signal Vcells proportional to the voltage across said cells being charged; (b) a second differential amplifier having a first input terminal coupled to a first end of a current sense resistor, and having a second input terminal coupled to a second end of said current sense resistor, and having an output terminal; whereby the output of said second differential amplifier is a signal proportional to the voltage drop across said current sense resistor; (c) an impedance tracking circuit having a first input terminal coupled to the positive end of cells being charged, a second input terminal coupled to the negative end of said cells, a third terminal coupled to the output terminal of said second differential amplifier, internal calculation engine, memory, and having an output terminal, whereby the output of said impedance tracking circuit is a desired charging voltage Vchgdes which is the sum of the nominal open circuit voltage of the cells for the present depth of discharge and the voltage drop across the internal impedance of the cells as computed by the Impedance Track circuit; (d) a comparator having a first input terminal coupled to said output terminal of said first differential amplifier, a second input terminal coupled to said output terminal of said impedance tracking circuit, and an output terminal, whereby the output state of said comparator is indicative of whether the actual voltage Vcells across the cells is greater than or less than the desired voltage Vchgdes; and (e) an analog coupling between said output terminal of said comparator and the compensation input terminal of a battery charger; whereby an "increase" or "decrease" signal is coupled to the battery charger, which periodically examines the state of this signal and adjusts its output in a stepwise manner until the voltage Vcells is nearly equal to the desired voltage Vchgdes.

In some embodiments, the apparatus may include a communication interface having an input terminal coupled to the output terminal of said comparator, and having an output terminal coupled to the data input terminal of a battery charger; whereby the "increase" and "decrease" commands are sent to the charger in a digital format using an appropriate protocol.

In another aspect, the invention provides a method for an apparatus including a digital processor to determine a compensation voltage value which is substantially equivalent to the sum of voltage drops across protection elements, sense resistor, and internal cell impedance of a battery pack being charged, which comprises: (i) measuring the voltage Vprot across the series connected protection elements (control transistors, current limiting device); (ii) measuring the voltage Vsense across a sense resistor Rsense; (iii.) calculating the charging current Ichg through resistor Rsense by dividing the measured Vsense by the known Rsense; (iv.) retrieving from memory the internal impedance Rint of the cells, that impedance having been computed by the method described by U.S. Pat. No. 6,832,171 B2; (v.) calculating the voltage drop Vint across the series connected cells by multiplying Rint by Ichg; (vi.) calculating the compensation voltage Vcomp by summing Vprot plus Vsense plus Vint: (vii.) communicating this compensation voltage Vcomp to the battery charger; (viii.) increasing the battery charger output voltage by an amount Vcomp; and (ix.) repeating the process as appropriate to allow for changes in measured parameters during battery charging.

In another aspect, the invention provides a method for an apparatus including a digital processor to adjust the charging voltage applied to cells in a battery so as to compensate for voltage loss between the battery charger and the cells being charged, which comprises: (i.) measuring the voltage Vcells across the series connected cells being charged; (ii.) measuring the voltage Vsense across a sense resistor Rsense; (iii.) calculating the charging current Ichg through resistor Rsense by dividing the measured Vsense by the known Rsense; (iv.) retrieving from memory the internal impedance Rint of the cells, Rint having been previously computed and stored using the methods described in U.S. Pat. No. 6,832,171 B2; (v.) calculating the voltage drop Vint across the cells due to the charging current Ichg and internal impedance Rint, by multiplying Rint by Ichg; (vi.) retrieving from memory the desired open circuit voltage (OCV) for the state of charge of the cells, this OCV having been computed and stored in a manner described in U.S. Pat. No. 6,832,171 B2; (vii.) adding the desired OCV to Vint to yield that desired charge voltage Vchgdes which will compensate for voltage drop in the cells due to internal impedance; (viii.) comparing voltage Vcells (measured voltage across cells) with voltage Vchgdes (desired voltage across cells); (ix.) if Vcells is less than Vchgdes, communicating an "increase charging voltage" command to the charger. otherwise; (x.) if Vcells is greater than Vchgdes, communicating a "decrease charging voltage" command to the charger; and (xi.) repeating the process, thereby causing the charging voltage to approach, by steps, the desired charging voltage.

Many other alternatives to the circuits and sub circuits described are possible while retaining the scope and spirit of the invention.

What is claimed is:

1. A compensation circuit for a battery charger for charging a battery having one or more cells which are series connected to an output thereof and have a protective device and current sensing device in series with the battery, the compensation circuit comprising:
   a first circuit coupled across the protective device for measuring a voltage drop across the protective device;
   a second circuit coupled to the current sensing device for generating a voltage corresponding to current flow in the battery;
   an impedance tracking circuit coupled across at least one cell of the battery and generating a signal corresponding to a voltage drop across an internal impedance of the at least one cell of the battery during battery charging, wherein the impedance tracking circuit retrieves a previously computed impedance of the battery cells and calculates a voltage drop across the battery as a product of the internal impedance and the current flow in the battery; and
   a third circuit coupled to an output of the first, second and impedance tracking circuits for generating a compensation signal for the battery charger at an output thereof, for increasing output voltage of the battery charger so as to charge a battery independent of static impedances and a variable impedance of the battery.

2. The compensation circuit of claim 1 further comprising an analog signal path from the output of the third circuit to an input of the battery charger for communicating a compensation voltage to the battery charger.

3. The compensation circuit of claim 1 further comprising a digital signal path from the output of the third circuit to an input of the battery charger for communicating a compensation voltage signal to the battery charger.

4. The compensation circuit of claim 1 wherein the protective device comprises a plurality of series-connected devices, the first comprises a first differential amplifier having a first input terminal coupled to a first end of the series-connected protection devices, and having a second input terminal coupled to a second end of the series-connected protection devices, and having an output terminal, whereby the output of said first differential amplifier is a signal proportional to the voltage drop across said series-connected protection devices; the second circuit comprises a second differential amplifier having a first input terminal coupled to a first end of a current sensing device, and having a second input terminal coupled to a second end of said current sensing device, and having an output terminal; whereby the output of said second differential amplifier is a signal proportional to the voltage drop across said current sensing device.

5. The compensation circuit of claim 4 wherein the third circuit comprises a summer circuit.

6. The compensation circuit of claim 1 wherein the third circuit determines a compensated output voltage for the battery charger, compares the compensated output voltage with a voltage across the battery and sends a signal to the battery charger to increase or decrease the battery charger output voltage in a stepwise manner until the voltage across the battery is substantially equal to a calculated voltage.

7. The compensation circuit of claim 6 wherein the third circuit comprises a first differential amplifier coupled across the battery, a second differential amplifier coupled to the current sensing device and having an output coupled an input of to the impedance tracking circuit, and a third differential amplifier having a first input coupled to an output of the impedance tracking circuit and a second input coupled to an output of the first differential amplifier.

8. The compensation circuit of claim 7 furthering comprising a communications interface coupled between an output of the third differential amplifier and an input to the battery charger.

9. A method for compensating an output of a battery charger for voltages developed across devices in series with the battery comprising:
   measuring a voltage drop across one or more protective devices in series with the battery to generate a first signal;
   measuring a voltage corresponding to a current flowing through the battery to generate a second signal;
   generating a signal corresponding to a voltage drop across an internal impedance of the battery during battery charging to generate a third signal, wherein generating a signal corresponding to a voltage drop across the internal impedance of the battery comprises retrieving a previously computed impedance of the battery cells and calculating a voltage drop across the battery as a product of the internal impedance and the current flow in the battery; and
   generating a battery charger compensation signal in response to the first, second and third signals for increasing output voltage of the battery charger so as to charge a battery independent of static impedances and a variable impedance of the battery.

10. The method of claim 9 further comprising communicating a compensation value to the battery charger over an analog communications path.

11. The method of claim 9 further comprising communicating a compensation value to the battery charger by a digital communications path.

12. The method of claim 9 further comprising comparing the battery charger compensation signal to a voltage across the battery to generate a signal to the battery charger to increase or decrease the battery charger output voltage in a stepwise manner until the voltage across the battery in substantially equal to a calculated voltage.

13. The method of claim 11 further comprising comparing the battery charger compensation signal to a voltage across the battery to generate a signal to the battery charger to increase or decrease the battery charger output voltage in a stepwise manner until the voltage across the battery in substantially equal to a calculated voltage.

14. The method of claim 12 further comprising sending a signal to the battery charger via a communications interface coupled between a compensation circuit and the battery charger.

15. The method of claim 13 further comprising sending a signal to the battery charger via a communications interface coupled between a compensation circuit and the battery charger.

16. Apparatus for generating increase and decrease voltage commands to a battery charger, comprising:

a first differential amplifier having a first input terminal coupled to a first end of cells being charged and having a second input terminal coupled to a second end of said cells being charged, and having an output terminal, whereby the output terminal of the first differential amplifier is a signal Vcells proportional to the voltage across the cells being charged;

a second differential amplifier having a first input terminal coupled to a first end of a current sense resistor, and having a second input terminal coupled to a second end of the current sense resistor, and having an output terminal whereby the output of the second differential amplifier is a signal proportional to the voltage drop across the current sense resistor;

an impedance tracking circuit having a first input terminal coupled to the positive end of cells being charged, a second input terminal coupled to the negative end of the cells, a third terminal coupled to the output terminal of the second differential amplifier, internal calculation engine, memory, and having an output terminal, whereby the output of the impedance tracking circuit is a desired charging voltage Vchgdes which is the sum of the nominal open circuit voltage of the cells for the present depth of discharge and the voltage drop across the internal impedance of the cells during battery charging as computed by the impedance tracking circuit;

a comparator having a first input terminal coupled to the output terminal of the first differential amplifier, a second input terminal coupled to the output terminal of the impedance tracking circuit, and an output terminal, whereby the output state of the comparator is indicative of whether the actual voltage Vcells across the cells is greater than or less than the desired voltage Vchgdes; and an analog coupling between said output terminal of the comparator and the compensation input terminal of a battery charger; whereby a signal to increase or decrease the output voltage thereof signal is coupled to the battery charger, which periodically examines the state of this signal and adjusts its output in a stepwise manner until the voltage Vcells is substantially equal to the desired voltage Vchgdes, thereby increasing output voltage of the battery charger so as to charge a battery independent of static impedances and a variable impedance of the battery.

* * * * *